United States Patent [19]
Yi

[11] Patent Number: 5,991,604
[45] Date of Patent: Nov. 23, 1999

[54] RING DETECTING CIRCUIT AND METHOD FOR WIRELESS/WIRED COMPOSITE TELEPHONE

[75] Inventor: Bae-Geun Yi, Gumi, Rep. of Korea

[73] Assignee: SamSung Electronics Co., Ltd., Suwon, Rep. of Korea

[21] Appl. No.: 08/780,144

[22] Filed: Dec. 26, 1996

[30] Foreign Application Priority Data

Dec. 26, 1995 [KR] Rep. of Korea .................. 95-56552

[51] Int. Cl.⁶ .................. H04B 1/40; H04M 1/00
[52] U.S. Cl. .................. 455/74.1; 455/567; 379/373; 379/377; 379/418
[58] Field of Search .................. 455/74.1, 567, 455/575, 117; 379/373, 418, 377, 375, 433, 93.28

[56] References Cited

U.S. PATENT DOCUMENTS

| | | | |
|---|---|---|---|
| 4,529,845 | 7/1985 | Boeckmann | 379/376 |
| 4,720,853 | 1/1988 | Szlam . | |
| 4,926,470 | 5/1990 | Sanford | 379/375 |
| 4,975,940 | 12/1990 | Hashimoto . | |
| 5,260,996 | 11/1993 | Dillon et al. | 379/418 |
| 5,509,068 | 4/1996 | Bayless et al. . | |
| 5,544,241 | 8/1996 | Dibner et al. . | |
| 5,675,640 | 10/1997 | Tappert et al. | 379/373 |
| 5,712,910 | 1/1998 | Saito | 379/373 |
| 5,751,803 | 5/1998 | Shpater | 379/379 |
| 5,787,365 | 7/1998 | Rivero et al. | 455/567 |

FOREIGN PATENT DOCUMENTS

| | | |
|---|---|---|
| 3612664 C2 | 10/1986 | Germany . |
| 3541547 A1 | 5/1987 | Germany . |
| 3728230 A1 | 3/1989 | Germany . |
| 4214125 C1 | 10/1993 | Germany . |
| 4328971 A1 | 3/1995 | Germany . |

*Primary Examiner*—Dwayne D. Bost
*Assistant Examiner*—Tracy M. Legree
*Attorney, Agent, or Firm*—Robert E. Bushnell, Esq.

[57] ABSTRACT

In a circuit for notifying ring signal reception to a wireless telephone in a wireless/wired composite telephone system having a direct-current (DC) blocking circuit for blocking a DC component from a ring signal input through a ring terminal and a tip terminal and a ring detector for adjusting output signals depending on the ring signal having frequency components, a ring detecting circuit including an optical coupler for blocking a negative portion of an inputted signal received from the ring detector and for inverting a positive portion and for outputting a signal corresponding thereto, and a filter for receiving the signal output from the optical coupler and for generating a ring detection signal.

7 Claims, 6 Drawing Sheets

RING DETECTING CIRCUIT AND METHOD FOR WIRELESS/WIRED COMPOSITE TELEPHONE

CLAIM OF PRIORITY

This application makes claims all benefits accruing under 35 U.S.C. §119 from an application for *Ring Detecting Circuit And method For Wireless/Wired Composite Telephone* earlier filed in the Korean Industrial Property Office on Dec. 26, 1995 and there duly assigned Ser. No. 56552/1995.

BACKGROUND OF THE INVENTION

1. Field of the Invention

The present invention relates to a ring detector and a method therefor, and more particularly, to a circuit and a method for detecting a ring in a wireless/wired composite telephone system.

2. Description of the Related Art

The operation of a circuit for detecting a ring in an earlier wireless/wired composite telephone system will be described with reference to FIGS. 1 and 2.

If no ring is received, a voltage difference of a direct current (DC) component ("$V_A$") of 45–75 volts occurs at both tip and ring terminals. However, if a ring is received, an alternating current (AC) component having a frequency of 18–60 Hz is superimposed on the DC component $V_A$ of 45–75 V to then be supplied to a telephone. The signal supplied to the telephone has such a format as shown in FIG. 2A.

The supplied signal has its the DC component $V_A$ removed by a DC blocking circuit 110 and outputs a signal having a frequency of 18–60 Hz ("$V_B$"). The $V_B$ signal is shown in FIG. 2B and is supplied to a ring detector 112. The ring detector 112 outputs a signal shown in FIG. 2D ("$V_D$") if the $V_B$ signal corresponds to the specifications. The $V_D$ signal shown in FIG. 2D is an audible signal having a frequency of 600–1200 Hz and notifies ring reception by oscillating a buzzer 114 of a wired telephone.

An attenuator 116 includes zener diodes D1 and D2 for adjusting voltages to output the $V_B$ signal applied from the DC blocking circuit 110 as the signal limited to a Zener breakdown voltage level. The signal limited to a Zener breakdown voltage level is supplied to an optical coupler 118 to supply a signal having a format shown in FIG. 2C ("$V_C$") to a CPU 120. Accordingly, the CPU 120 controls the wireless telephone to notify ring reception.

Now, a ring detection method will be described with reference to FIGS. 1 and 3.

In step 310, it is determined whether an inverting signal corresponding to an interrupt by ring reception is detected by an interrupt port of the CPU 120. If the inverting signal is detected, the process proceeds to a step 312 and measures the frequency of a signal supplied to the optical coupler 118 to determine whether the measured frequency corresponds to a ring frequency. If it is determined in the step 312 that the measured frequency is a ring frequency, the CPU 120 detects a ring on time of the supplied signal in step 314. Whenever the ring on time is detected, the CPU 120 calls up the wireless telephone to notify ring reception in step 316. In response thereto, the calling for notifying ring reception is continuously performed until a hook-off is detected in step 318.

In this earlier wireless/wired composite telephone system, since a ring-dedicated chip is used for the ring detector of a wired telephone, there is no induced problem.

However, since the ring detector of a wireless telephone requires an attenuator for attenuating a ring signal and limiting the same, it is difficult to simplify the circuit. Further, due to increased raw material cost and cumbersome operational processes, the manufacturing cost becomes increased.

Another problem of the ring detector is in that a general input/output port cannot be used but only an interrupt port can be used. Also, in order to measure the frequency, the memory size must increase depending on the increased software.

SUMMARY OF THE INVENTION

Therefore, it is an object of the present invention to provide a circuit for detecting a ring without using an attenuating and limiting circuit.

It is another object of the present invention to provide a circuit for implementing a simple output using a transistor after AC coupling and filtering.

DETAILED DESCRIPTION OF THE PREFERRED EMBODIMENT

Hereinbelow, the present invention will be described in detail with reference to accompanying drawings.

Figure 1:
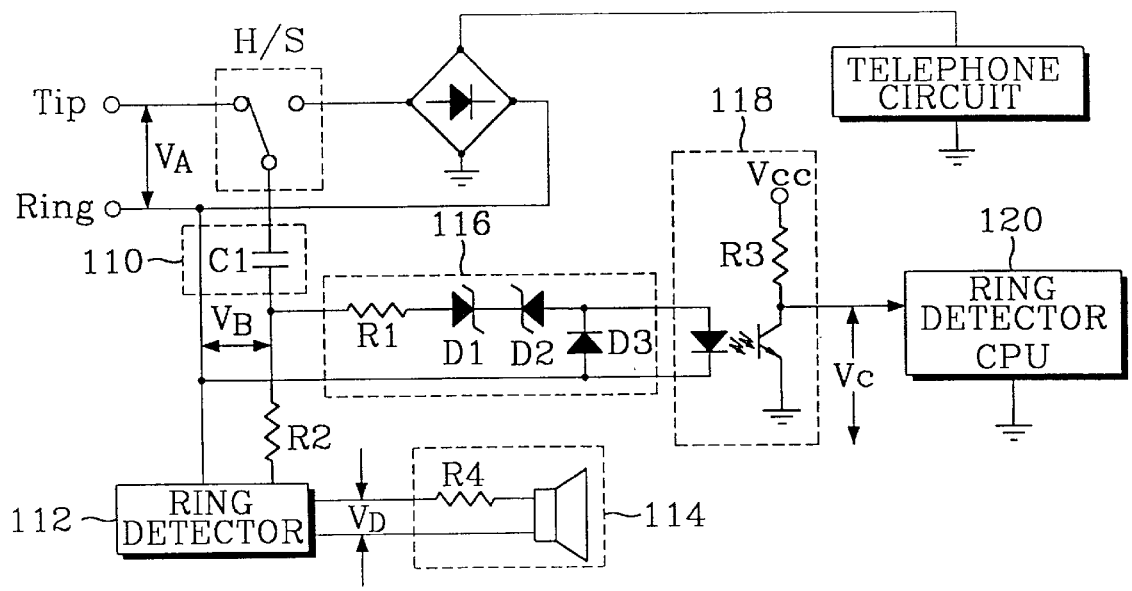
FIG. 1 is a circuit diagram of a ring detector in an earlier wireless/wired composite telephone system.
Figure 4:
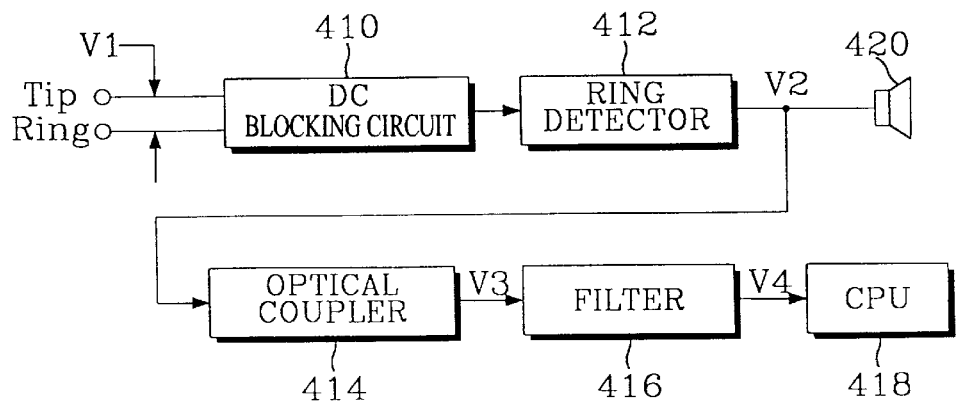
FIG. 4 is a block diagram of a ring detector in a wireless/wired composite telephone system according to the present invention.
Figure 2A:
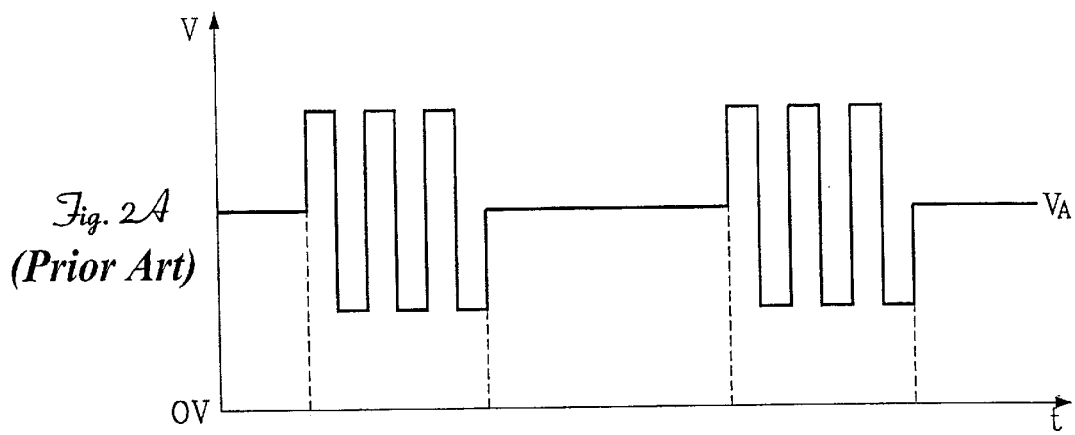
FIGS. 2A through 2D show formats of signals generated at various parts of the earlier ring detector.
Figure 2B:
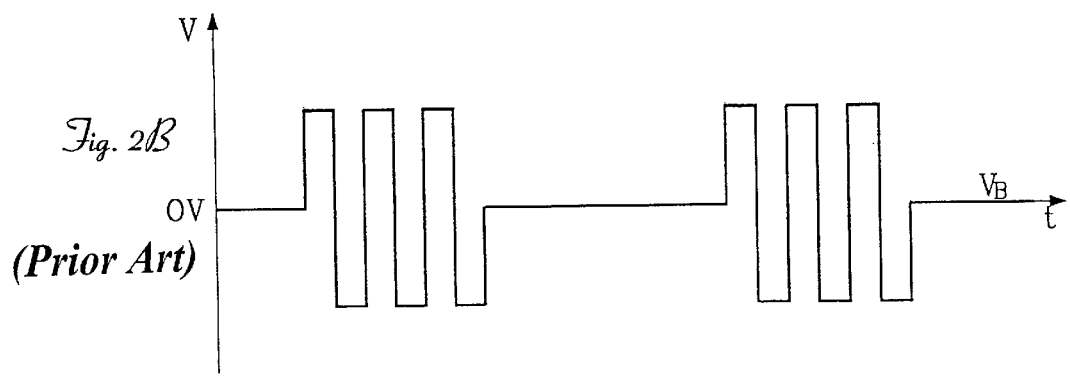
Figure 2C:
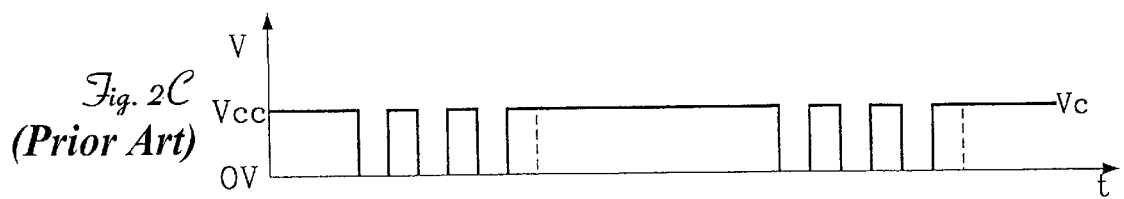
Figure 2D:
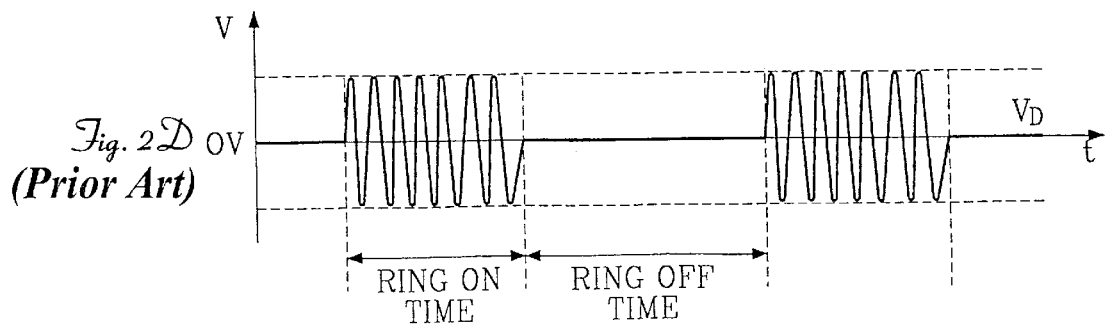
Figure 3:
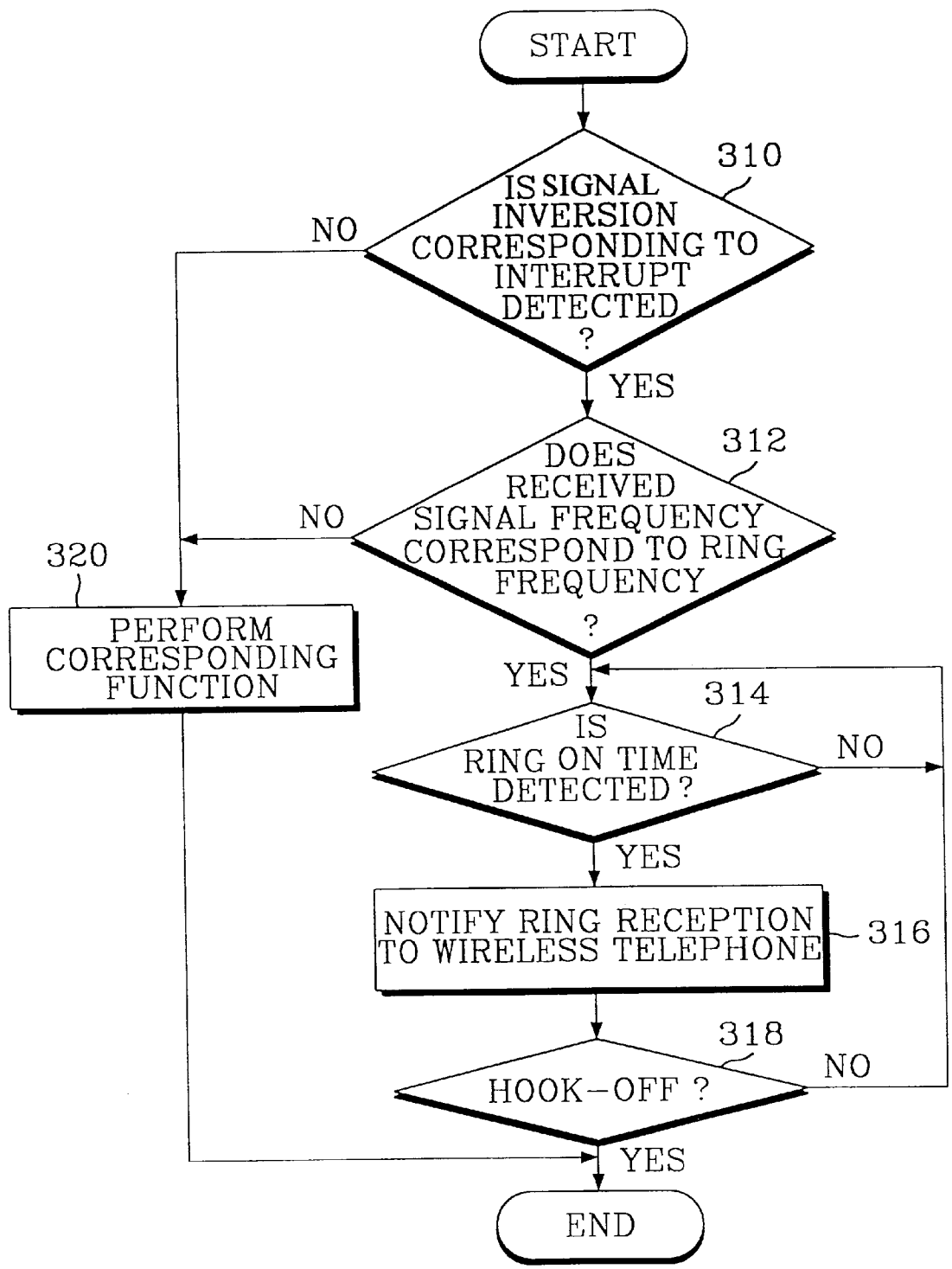
FIG. 3 is a flowchart illustrating notifying ring reception to a wireless telephone when a ring is detected in the earlier wireless/wired composite telephone system.

FIG. 4 is block diagram of a ring detector in a wireless/wired composite telephone system according to the present invention.

A direct-current (DC) blocking circuit 410 blocks DC current using a metal capacitor C1 having a high internal breakdown voltage, and couples and outputs only a ring signal having alternating-current (AC) components.

A ring detector 412 commercialized and used conventionally adjusts and outputs conditions of output signals depending on input signals received from the DC blocking circuit 410.

An optical coupler 414 receives an input signal received from the ring detector 412 and electrically isolates it into an input side and an output side.

A filter 416 simply receives the ring signal input from the optical coupler 414 and outputs it to a detector port of a CPU 418.

Figure 5:
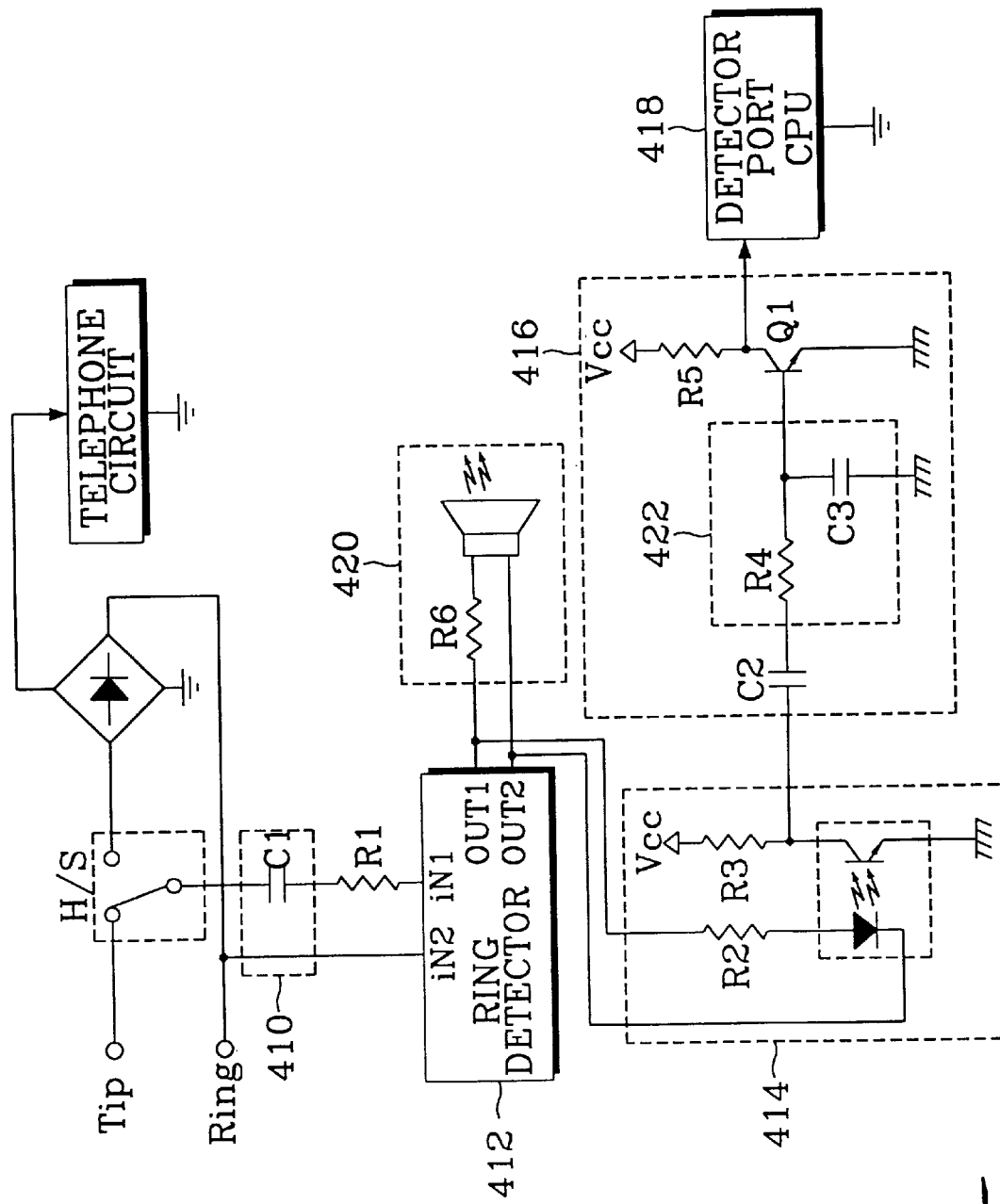
FIG. 5 is a detailed circuit diagram of a ring detector in the wireless/wired composite telephone system according to the present invention.

FIG. 5 is a detailed circuit diagram of a ring detector in a wireless/wired composite telephone system according to the present invention.

An optical coupler 414 is comprised of resistances R2 and R3, a photo-diode and a phototransistor, the input terminal thereof is connected to the output terminal of the ring detector 412 and the output terminal thereof is connected to a filter 416.

The filter 416 is comprised of a capacitor C2 for coupling only the AC components from the signal output from the optical coupler 414, an integrator 422 for integrating the coupled AC components, and converting and outputting the same into DC components, and a transistor Q1 for simply outputting a signal input from the integrator 422.

Figure 6A:
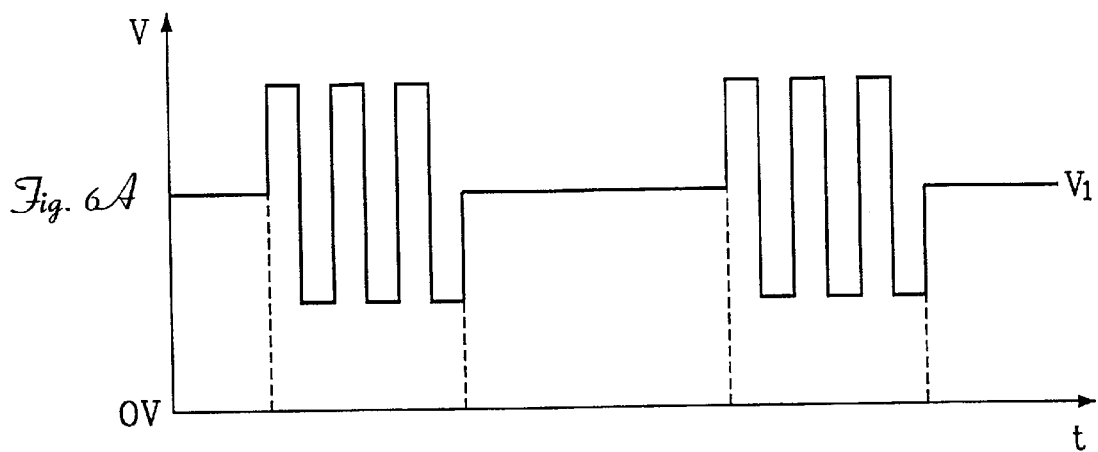
FIGS. 6A through 6D show formats of signals generated at various parts of a ring detector according to the present invention.
Figure 6B:
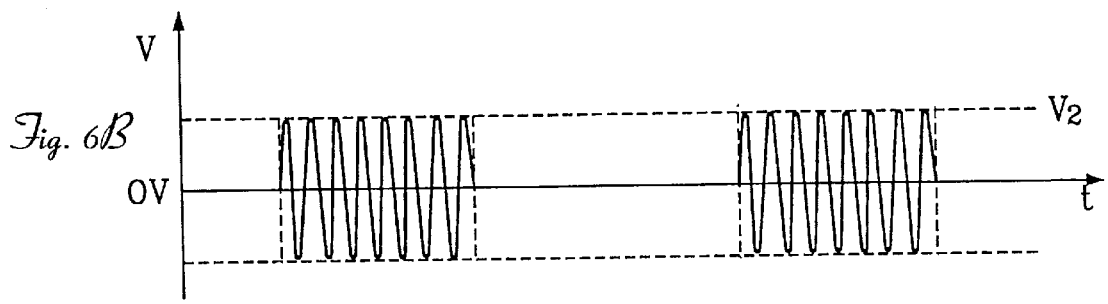
Figure 6C:
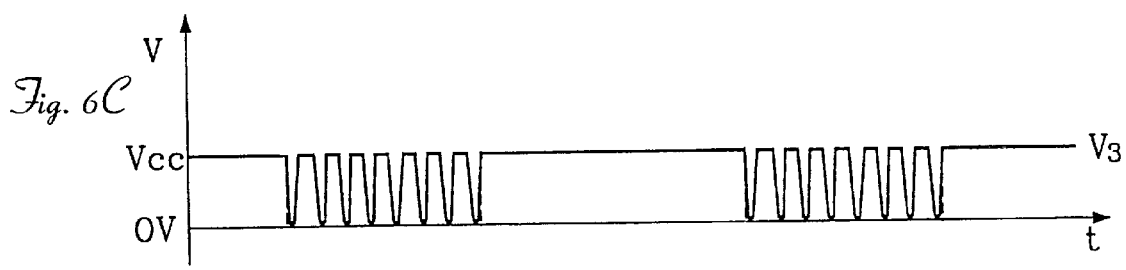
Figure 6D:
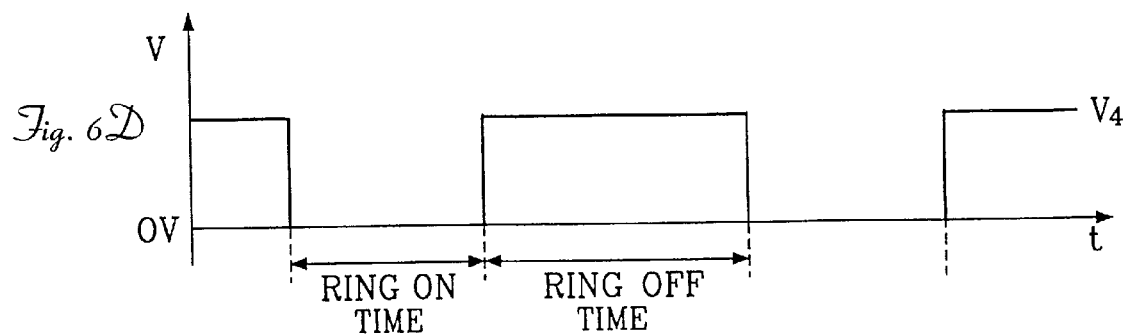

FIGS. 6A and 6D shows signal formats generated from various parts of the ring detector according to the present invention.

FIG. 6A shows V1 corresponding to the signal output via a ring terminal and a tip terminal, and FIG. 6B shows V2 corresponding to the signal output via the ring detector 412.

Also, FIG. 6C shows V3 corresponding to the signal output via the optical coupler 414, and FIG. 6D shows V4 corresponding to the final output signal input to the CPU 418 via the filter 416.

Figure 7:
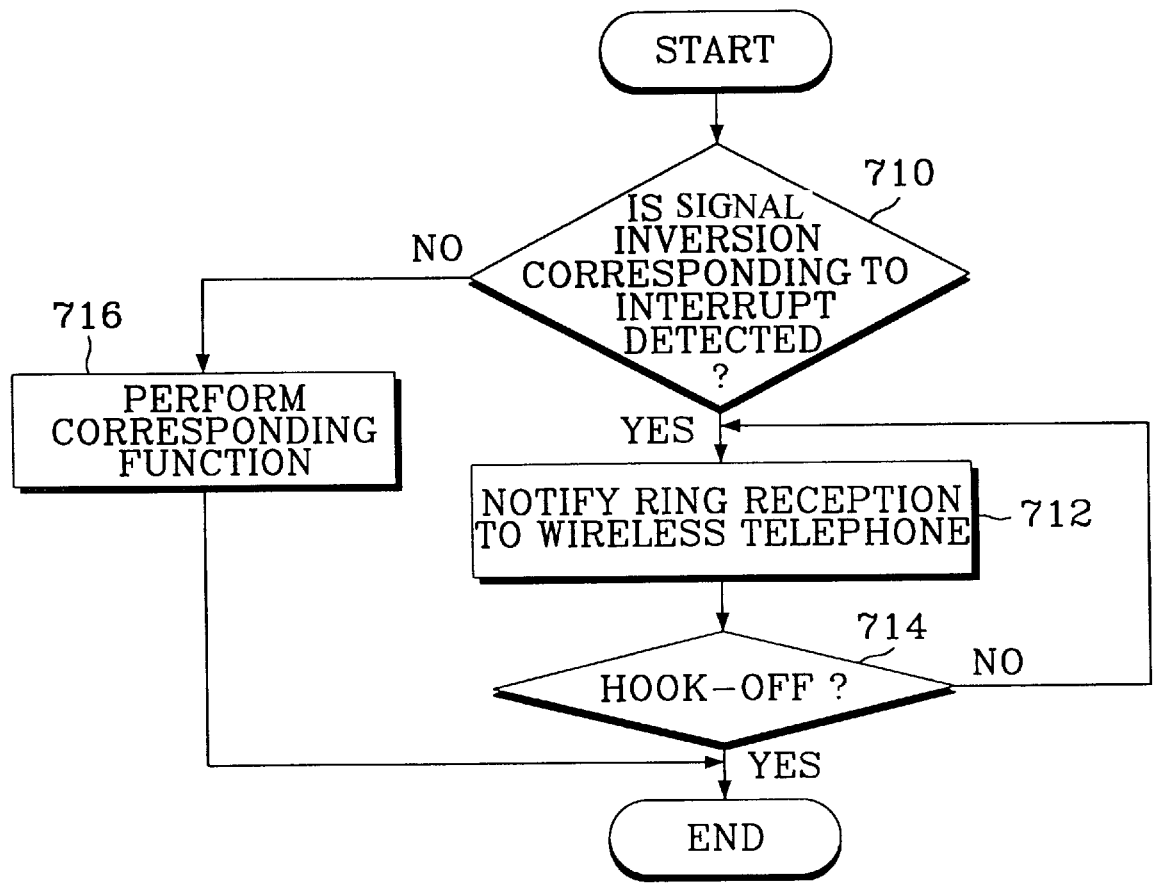
FIG. 7 is a flowchart illustrating notifying ring reception to a wireless telephone when a ring is detected in the wireless/wired composite telephone system according to the present invention.

FIG. 7 is a flowchart illustrating notifying a ring reception to a wireless telephone when a ring is detected in the wireless/wired composite telephone system according to the present invention, which includes the steps of detecting whether a signal inversion corresponding to an interrupt has been generated, and notifying ring reception to the wireless telephone if the interrupt has been generated.

An embodiment of the present invention will now be described in detail with reference to FIGS. 4, 5, 6A–6D and 7.

If no ring is received, there occurs a voltage difference of DC 45–75 V between the tip and ring terminals. However, if a ring is received, an AC component having a frequency of 18–60 Hz is superimposed on the DC component of 45–75 V and is then supplied to a telephone. The signal supplied to the telephone ("V1") has a format shown in FIG. 6A.

The DC component 48–75 V of the signal V1 is blocked by a metal capacitor C1 of the DC blocking circuit 410, so that only the ring signal having a frequency of 18–60 Hz is detected to be supplied to the ring detector 412. The ring detector 412 outputs a signal having a format as shown in FIG. 6B ("V2") if the supplied ring signal has suitable specifications. The V2 signal shown in FIG. 6B is an audible signal having a frequency of 600–1200 Hz and oscillates a buzzer 420 to notify ring reception to a wired telephone.

Also, the V2 signal output from the ring detector 412 is input to the optical coupler 414 connected in parallel therewith. The photo-diode of the optical coupler 414 is turned on for a positive period, and is turned off for a negative period. The optical coupler 414 outputs a signal shown in FIG. 6C ("V3") depending on the on/off state of the photo-diode. Only the AC components of the V3 signal are coupled by the capacitor C2 of the filter 416 to be output. The coupled AC components are converted into DC components by the integrator 422 comprised of a resistance R4 and a capacitor C3 in the filter 416. The converted DC signal is input to the base of the transistor Q1 as its input signal, and a signal shown in FIG. 6D ("V4") is output to the output port thereof. The V4 signal is for notifying ring reception, and the CPU 418 notifies the wireless telephone of the ring reception if the V4 signal is received.

As described above, according to the present invention, the manufacturing cost is saved and the circuit can be simplified. Also, ring reception delay time can be reduced. Further, a software for constructing the circuit can be simplified.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a circuit for notifying ring signal reception to a wireless telephone in a wireless/wired composite telephone system having a direct-current (DC) blocking circuit for blocking a DC component from a ring signal input through a ring terminal and a tip terminal and a ring detector for adjusting output signals depending on said ring signal having frequency components, a ring detecting circuit comprising:

an optical coupler for blocking a negative portion of an inputted signal received from said ring detector and inverting a positive portion and for outputting a signal corresponding thereto; and a filter for receiving the signal output from said optical coupler and for generating a ring detection signal in response thereto.

2. A ring detecting circuit as claimed in claim 1, wherein said filter comprises:

a capacitor for coupling only AC components from the signal output from said optical coupler;

an integrator for integrating said coupled AC components, and for converting them into DC components and for outputting said DC components; and a transistor for receiving said DC components outputted from said integrator and for generating the ring detection signal.

3. In a circuit for notifying ring reception to a wireless telephone in a system having a wireless telephone connected in parallel therewith, a ring detecting circuit comprising:

a direct-current (DC) blocking circuit for blocking a DC component from a ring signal input through a ring terminal and a tip terminal and for generating only a pure ring signal;

a ring detector for adjusting output signals for driving a buzzer depending on said pure ring signal received from said DC blocking circuit;

an optical coupler for blocking a negative portion of an output signal received from said ring detector and inverting a positive portion thereof and for outputting a signal corresponding thereto;

a capacitor for coupling only AC components from the signal output from said optical coupler;

an integrator for integrating said coupled AC components, and converting the same into DC components and outputting said DC components; and a transistor for receiving said DC components output from said integrator and for generating a ring detection signal.

4. In a circuit for detecting a ring signal from a terminal additionally having a wireless telephone function, a ring detecting circuit comprising:

a direct-current (DC) blocking circuit for blocking a DC component from a ring signal input through a ring terminal and a tip terminal and for generating only a pure ring signal;

a ring detector for adjusting output signals for driving a buzzer depending on said pure ring signal received from said DC blocking circuit;

an optical coupler for blocking a negative portion of an output signal received from said ring detector and for inverting a positive portion thereof and for outputting a signal corresponding thereto;

a capacitor for coupling only AC components from the signal output from said optical coupler;

an integrator for integrating said coupled AC components, and for converting them into DC components and for outputting said DC components; and a transistor for receiving said DC components output from said integrator and generating a ring detection signal.

5. A ring detection method for notifying ring reception to a wireless telephone in a system having a wireless telephone connected in parallel therewith, said method comprising:

blocking a DC (direct current) component from a ring signal input through a ring terminal and a tip terminal and generating only a pure alternating current ring signal;

s adjusting outputting signals for ringing a buzzer in accordance with said pure ring signal;

blocking a negative portion of the signal for driving a buzzer and inverting a positive portion thereof and outputting a signal corresponding thereto; coupling only AC (alternating current) components from said signal;

intergrating said coupled AC components and converting them into DC component and outputting said DC components; and receiving said DC components and generating a ring detection signal in response thereto.

6. In a circuit for notifying ring signal reception to a wireless telephone in a wireless/wired composite telephone system having a direct current (DC) blocking circuit for blocking a DC component from a ring signal input through a ring terminal and a tip terminal and a ring detector for adjusting output signals depending on said ring signal having frequency components, a ring detecting method comprising:

blocking a negative portion of an input signal received from said ring detector and inverting a positive portion thereof and outputting a signal corresponding thereto; and receiving the signal and generating a ring detection signal in response thereto with a filter.

7. The method as recited in claim 6, said step of receiving the output signal and generating a ring detection signal comprising:

coupling only AC components from the signal and integrating said coupled AC components and converting them into DC (direct current) components and outputting said DC components; and receiving said DC components and generating the ring detection signal.

* * * * *